(12) United States Patent
Yu et al.

(10) Patent No.: US 11,626,585 B2
(45) Date of Patent: Apr. 11, 2023

(54) ELECTRODE MATERIAL AND A METHOD OF PREPARING THE SAME

(71) Applicant: City University of Hong Kong, Kowloon (HK)

(72) Inventors: Yau Wai Denis Yu, Mid-Level (HK); Pui Kit Lee, Kowloon (HK); Tian Tan, Kowloon (HK)

(73) Assignee: City University of Hong Kong, Kowloon (HK)

( * ) Notice: Subject to any disclaimer, the term of this patent is extended or adjusted under 35 U.S.C. 154(b) by 440 days.

(21) Appl. No.: 16/154,883

(22) Filed: Oct. 9, 2018

(65) Prior Publication Data

US 2020/0112020 A1 Apr. 9, 2020

(51) Int. Cl.
| | |
|---|---|
| *H01M 4/36* | (2006.01) |
| *H01M 4/48* | (2010.01) |
| *B01J 13/02* | (2006.01) |
| *H01M 4/13* | (2010.01) |
| *H01M 4/62* | (2006.01) |

(52) U.S. Cl.
CPC .............. *H01M 4/366* (2013.01); *B01J 13/02* (2013.01); *H01M 4/13* (2013.01); *H01M 4/483* (2013.01); *H01M 4/628* (2013.01)

(58) Field of Classification Search
CPC ........ H01M 4/13; H01M 4/366; H01M 4/483; H01M 4/628; B01J 13/02
See application file for complete search history.

(56) References Cited

U.S. PATENT DOCUMENTS

| | | | |
|---|---|---|---|
| 2008/0166474 A1* | 7/2008 | Deguchi ............... | H01M 4/366 427/122 |
| 2017/0012325 A1* | 1/2017 | Zhu ........................ | H01M 4/625 |
| 2017/0256783 A1* | 9/2017 | Mano ...................... | C25D 5/48 |
| 2019/0305295 A1* | 10/2019 | Cui ........................ | H01M 4/366 |

FOREIGN PATENT DOCUMENTS

KR  1020160107737 A  *  9/2016  ............ H01M 4/604

OTHER PUBLICATIONS

Seong et al., KR 1020160107737; Espacenet Machine translation, Sep. 19, 2016 (Year: 2019).*
W. M. Chen, et. al, Self-assembly LiFePO4/polyaniline composite cathode materials with inorganic acids as dopants for lithium-ion batteries, Journal of Electroanalytical Chem. 660 (2011) 108-113.
Y. Fu, et. al, Orthorhombic Bipyramidal Sulfur Coated with Polypyrrole Nanolayers As a Cathode Material for Lithium-Sulfur Batteries, J. Phys. Chem. C 2012, 116, 8910-8915.

(Continued)

*Primary Examiner* — Adam A Arciero
(74) *Attorney, Agent, or Firm* — Renner Kenner Greive Bobak Taylor & Weber

(57) ABSTRACT

A method of preparing an electrode material includes heating a substrate with a bonding agent to form a self-assembled monolayer-containing material; and depositing a polymer coating onto the self-assembled monolayer-containing material under an elevated temperature to form a layered material. An electrode material and an electrode incorporating the electrode material is also provided.

19 Claims, 7 Drawing Sheets

(56) References Cited

OTHER PUBLICATIONS

S. H. Lee, et. al, Self-Assembled Fe3O4 Nanoparticle Clusters as High-Performance Anodes for Lithium Ion Batteries via Geometric Confinement, Nano Lett. 2013, 13, 4249-4256.
L. Shao, et. al, Preparation and characterization of attapulgite/ polyaniline nanofibers via self-assembling and graft polymerization, Chemical Engineering Journal 161 (2010) 301-307.
H. Wu, et. al, Stable Li-ion battery anodes by in-situ polymerization of conducting hydrogel to conformally coat silicon nanoparticles, Nat. Commun. 4:1943 doi: 10.1038/ncomms2941 (2013).
C. Yang, et al, Core-shell attapulgite@polypyrrole composite with well-defined corn cob-like morphology via self-assembling and in situ oxidative polymerization, Synthetic Metals 159 (2009) 2056-2062.
W. Zhou, et al, Yolk-Shell Structure of Polyaniline-Coated Sulfur for Lithium-Sulfur Batteries, J. Am. Chem. Soc. 2013, 135, 6736-16743.

\* cited by examiner

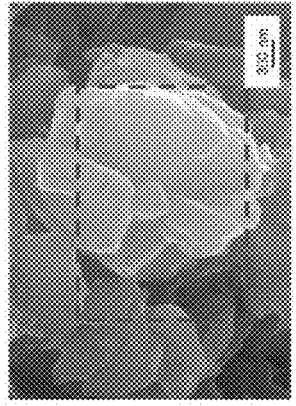
FIG. 2A
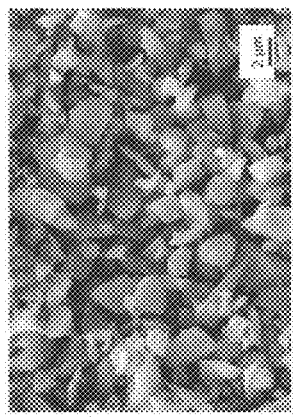
FIG. 2B
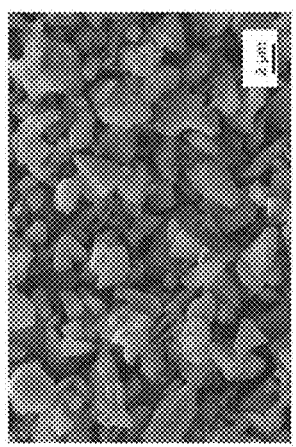
FIG. 2C
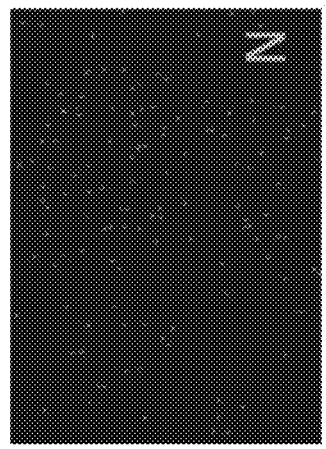
FIG. 2D
FIG. 2E
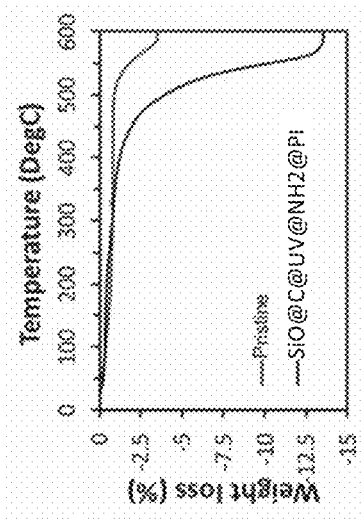
FIG. 2F

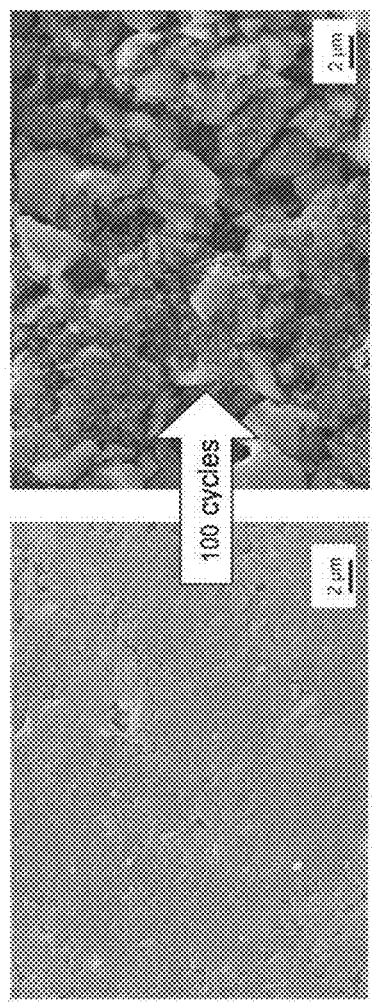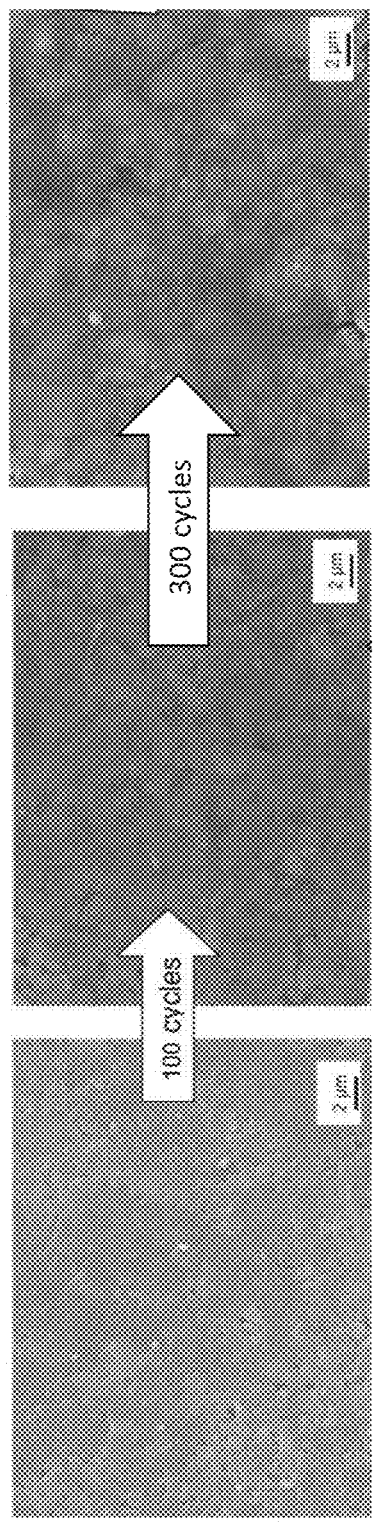

ELECTRODE MATERIAL AND A METHOD OF PREPARING THE SAME

TECHNICAL FIELD

The present invention relates to an electrode material, a method of preparing the electrode material and an electrode comprising the electrode material, specifically, although not exclusively, to an electrode material having a monolayer and a coating and to a method of preparing an electrode material with a monolayer and a coating.

BACKGROUND

Energy storage is a capture of energy produced at one time for use at a later time, which involves the conversion of energy from forms that are difficult to store to a more conveniently or economically storable form for storing in a device such as battery.

A battery may be of many forms and available voltages. Nevertheless, regardless of these characteristics, a battery generally includes one or more electrochemical cells which are composed of at least a cathode, an anode, and an electrolyte. Upon connecting to an external circuit, the anode captures the electrons from the chemical reaction occurred in the electrolyte so as to act as a source of electron to supply electrons towards the cathode and deliver energy to an external device.

With the quick evolution of modern technologies, the requirements on the lifetime and the energy density of battery is highly demanding. In order to meet such challenge, the design of the battery components is of paramount importance.

SUMMARY OF THE INVENTION

In accordance with the first aspect of the invention, there is provided a method of preparing an electrode material comprising the steps of: a) heating a substrate with a bonding agent to form a self-assembled monolayer-containing material; and b) depositing a polymer coating onto the self-assembled monolayer-containing material under an elevated temperature to form a layered material.

In an embodiment of the first aspect, the bonding agent includes a compound of Formula (I):

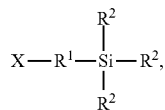

wherein
X is an epoxy group, ureido group, amino group, or an isocyano group,
$R^1$ is an unsubstituted or substituted straight or branched alkyl chain having 1 to 17 carbon atoms,
$R^2$ is an alkoxy group having 1 to 6 carbon atoms, a hydroxyl group, or a chloro group.

In an embodiment of the first aspect, the bonding agent includes the compound of Formula (I) with X being an ureido group or an amino group, $R^1$ being an unsubstituted straight alkyl chain having 1 to 17 carbon atoms, and $R^2$ being an alkoxy group having 1 to 6 carbon atoms.

In an embodiment of the first aspect, the bonding agent includes the compound of Formula (I) with X being an amino group, $R^1$ being a propyl group, and $R^2$ being an ethoxy group.

In an embodiment of the first aspect, the method further includes step a0), prior to step a), of inducing reactive groups on the surface of the substrate by an oxidation treatment for facilitating the binding between the bonding agent and the substrate.

In an embodiment of the first aspect, step b) further includes a step of mixing the material obtained in step a) with a polymer monomer and a dipolar aprotic solvent to form a slurry.

In an embodiment of the first aspect, the polymer monomer includes a polyimide monomer, a polyamic acid monomer, a polyamide monomer, a polypyrrole monomer, or a polyaniline monomer.

In an embodiment of the first aspect, the dipolar aprotic solvent includes N-methyl pyrrolidone, tetrahydrofuran, N,N-dimethylformamide, dimethylacetamide, or N-butyl propionate.

In an embodiment of the first aspect, the mixing process includes a ball milling process.

In an embodiment of the first aspect, the substrate includes a metal, a metal oxide, graphite, silicon-based material, metal phosphate, or lithium metal oxide.

In an embodiment of the first aspect, the oxidation treatment includes an ultraviolet-ozone treatment.

In an embodiment of the first aspect, the reactive groups include hydroxyl groups.

In accordance to the second aspect, there is provided an electrode material comprising a substrate, a self-assembled monolayer formed on the substrate, and a polymer coating deposited on the self-assembled monolayer.

In an embodiment of the second aspect, the self-assembled monolayer includes a bonding agent for covalently attaching to the surface of the substrate.

In an embodiment of the second aspect, the bonding agent includes a compound of Formula (I):

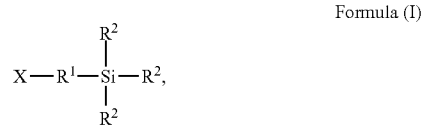

wherein
X is an epoxy group, ureido group, amino group, or an isocyano group,
$R^1$ is an unsubstituted or substituted straight or branched alkyl chain having 1 to 17 carbon atoms,
$R^2$ is an alkoxy group having 1 to 6 carbon atoms, a hydroxyl group, or a chloro group.

In an embodiment of the second aspect, the bonding agent includes the compound of Formula (I) with X being an ureido group or an amino group, $R^1$ being an unsubstituted straight alkyl chain having 1 to 17 carbon atoms, and $R^2$ being an alkoxy group having 1 to 6 carbon atoms.

In an embodiment of the second aspect, the bonding agent includes the compound of Formula (I) with X being an amino group, $R^1$ being a propyl group, and $R^2$ being an ethoxy group.

In an embodiment of the second aspect, the polymer coating includes a polymer monomer for covalently attaching to the self-assembled monolayer or attaching to the self-assembled monolayer through hydrogen bonding.

In an embodiment of the second aspect, the polymer monomer includes a polyimide monomer, a polyamic acid monomer, a polyamide monomer, a polypyrrole monomer, or a polyaniline monomer.

In an embodiment of the second aspect, the substrate includes a metal, a metal oxide, graphite, silicon-based material, metal phosphate, or lithium metal oxide.

In accordance with the third aspect, there is provided an electrode comprising an electrode material in accordance with the second aspect.

In an embodiment of the third aspect, the electrode material is arranged to maintain the uniformity of the electrode during charging and discharging cycles.

In an embodiment of the third aspect, the electrode material reduces the cracking of the electrode during charging and discharging cycles.

BRIEF DESCRIPTION OF THE DRAWINGS

Embodiments of the present invention will now be described, by way of example, with reference to the accompanying drawings in which:

FIG. 2A is a scanning electron microscopy image of SiO@C;

FIG. 2B is a scanning electron microscopy image of SiO@C@UV@NH$_2$@PI;

FIG. 2C is a magnified scanning electron microscopy image of FIG. 2B;

FIG. 2D is an energy dispersive X-ray spectroscopy mapping showing the C distribution of the selected area in FIG. 2C;

FIG. 2E is an energy dispersive X-ray spectroscopy mapping showing the N distribution of the selected area in FIG. 2C;

FIG. 2F is a plot showing the thermogravimetric analysis results of SiO@C and SiO@C@UV@NH$_2$@PI;

FIG. 6A is a scanning electron microscopy image of pristine SiO@C electrode;

FIG. 6B is a scanning electron microscopy image of the pristine SiO@C electrode in FIG. 6A after 100 cycles at 150 mA g$^{-1}$;

FIG. 6C is a scanning electron microscopy image of the pristine SiO@C@UV@NH$_2$@PI electrode;

FIG. 6D is a scanning electron microscopy image of the pristine SiO@C@UV@NH$_2$@PI electrode in FIG. 6C after 100 cycles at 150 mA g$^{-1}$; and FIG. 6E is a scanning electron microscopy image of the pristine SiO@C@UV@NH$_2$@PI electrode in FIG. 6C after 300 cycles at 1 A g$^{-1}$.

DETAILED DESCRIPTION OF THE PREFERRED EMBODIMENT

Figure 1:
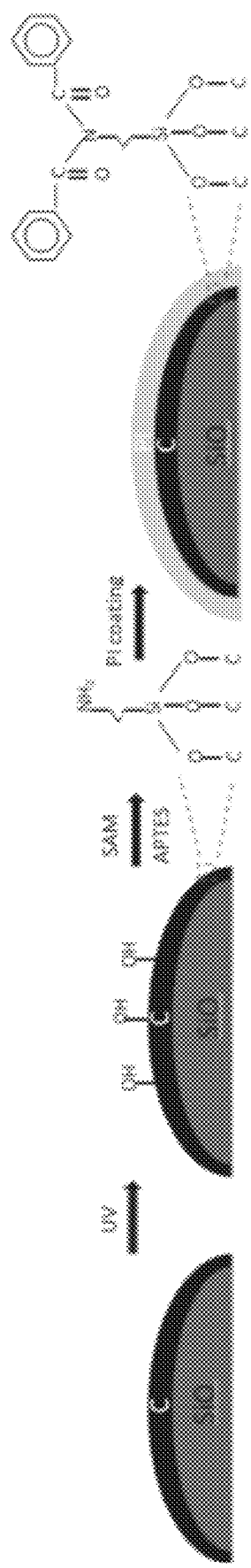
FIG. 1 is a schematic diagram showing the preparation process of the electrode material in accordance with one embodiment of the present invention.

Energy storage is becoming an essential part of our contemporary society, especially with the introduction of renewable energy to replace fossil fuel. Among different energy storage technologies, lithium-ion batteries (LIBs) have dominated the market for mobile applications so far due to their high energy density. Currently, graphite is used in commercial LIBs as anode. Nonetheless, to meet future demands, energy density of LIBs may need to be increased.

One of the possible strategies may be replacing graphite with metal oxides such as iron oxides, nickel oxides, cobalt oxides, etc. or elements such as Si, Sb, and Sn, etc. However, these materials are generally mechanically unstable since they undergo severe volume change during lithium insertion and extraction, causing mechanical failures such as particle pulverization and electrodes cracking, leading to loss of electrical contact between particles and/or current collector, resulting in fast capacity fading and low Coulombic efficiency upon cycling.

Alternatively, nano-particles may be applied in the anode construction. However, nano-particles are usually difficult to handle and energy-intensive to produce in large scale. In addition, the larger surface area resulted from nano-sized particles facilitates undesirable side reactions between active material and electrolyte. Accordingly, it is of great importance to develop materials with reduced surface side reactions and simple production process while retaining the integrity of the particles to further enhance cycle stability.

Without wishing to be bound by theories, the inventors have, through their own research, trials and experiments, devised that an electrode material that is highly resistant to volume change and particle pulverization during charging and discharging cycle may be prepared by incorporating a high-modulus polymer coating to a conductive material through a cross-linking layer.

In the first aspect of the invention, there is provided a method of preparing an electrode material. The method comprises the steps of heating a substrate with a bonding agent to form a self-assembled monolayer-containing material; and depositing a polymer coating onto the self-assembled monolayer-containing material under an elevated temperature to form a layered material. The method may be applied to prepare an electrode material for cathode and anode in a battery.

Initially, a substrate is heated with a bonding agent to form a self-assembled monolayer-containing material.

Preferably, the substrate may be a base material on which processing is conducted to produce a new layer of material. The substrate may be of any forms and shape, and is for example, a layer or a multilayer structure, a powder or a film providing a surface on which the new layer of material is produced. In particular, the substrate is a material such as a metal, a metal oxide, graphite, a metal phosphate, a lithium metal oxide, or a silicon-based material. Preferably, the substrate may also be a silicon-based material pretreated with a layer of conductive material such as silicon oxide coated with carbon (carbon coated SiO).

Preferably, the "bonding agent" refers to a chemical compound or an agent that can link two materials together by a chemical bond such as a covalent bond, hydrogen bond, or an ionic bond.

In particular, the bonding agent may be an amphiphilic compound that links the two materials together by the formation of the self-assembled monolayer as an intermediary. The phrase "amphiphilic compound" refers to any chemical compounds possessing both hydrophilic (i.e. water-loving, polar) and lipophilic (i.e. fat-loving) properties. The term "bonding agent" used herein is interchangeable with "cross-linking agent" or "coupling agent".

The term "self-assembled monolayer (SAM)" refers to a closed packed array of amphiphilic compounds which uniformly form a layer on a material surface and provide a plurality of functional groups for further surface modification.

Preferably, the bonding agent includes a compound of Formula (I):

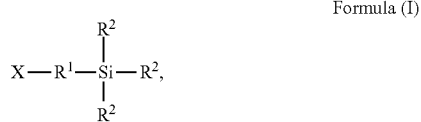

Formula (I)

wherein X is an epoxy group, ureido group, amino group, or an isocyano group, $R^1$ is an unsubstituted or substituted straight or branched alkyl chain having 1 to 17 carbon atoms, $R^2$ is an alkoxy group having 1 to 6 carbon atoms, a hydroxyl group, or a chloro group.

In one embodiment, X may be an ureido group or an amino group. $R^1$ may be an unsubstituted straight C1-C17 alkyl chain such as methyl, ethyl, propyl, butyl, pentyl or hexyl, etc. or a branched C1-C6 alkyl chain. In particular, $R^1$ is an unsubstituted straight alkyl chain having 1 to 6 carbon atoms. $R^2$ may be an alkoxy group having 1 to 6 carbon atoms such as methoxy, ethoxy, propoxy, butoxy, pentoxy, hexyloxy.

In a more preferred embodiment, X may be an amino group, $R^1$ may be a propyl group, and $R^2$ may be an ethoxy group.

Due to their chemical properties, the binding between the substrate and the bonding agent may not be effective. Preferably, the substrate may be subjected to a pre-treatment e.g. an oxidation treatment to induce reactive groups on the surface of the substrate so as to facilitate the binding of the bonding agent and the substrate. For instance, the reactive groups may be any functional groups that can covalently bind with the bonding agent to form a strong covalent bond such as a siloxane bond with the bonding agent.

Preferably, the reactive group may be selected from hydroxyl, carboxyl, or carbonyl groups. In one preferred embodiment, the reactive groups may be hydroxyl groups that are induced by an ultraviolet-ozone treatment.

After the self-assembled monolayer-containing material is obtained, the material may be deposited with a polymer coating thereon at an elevated temperature to form a layered material. The term "polymer coating" refers to a polymer being applied on and covering the top layer of a surface of a substance. Advantageously, the coating may protect the surface from corrosion, and change the surface chemistry, wettability and hydrophobicity.

Preferably, the "polymer" refers to a substance that contains a molecular structure that mainly contains a large number of similar units (i.e. monomer). In one embodiment, the monomer may be a compound that can react with the amine groups of the self-assembled monolayer-containing material. In particular, the monomer may be a polyimide monomer, a polyamic acid monomer, a polypyrrole monomer, a polyaniline monomer, or a polyamide monomer. Preferably, the monomer is a polyimide monomer or a polyamide monomer.

To deposit a polymer coating on the self-assemble monolayer-containing material, the monomer may be mixed with the material in the presence of a solvent using a ball milling process. The solvent may be any solvent that can dissolve the monomer. In one embodiment, the solvent may be a dipolar aprotic solvent.

The phrase "dipolar" refers to an electrically neutral chemical compound carrying a positive and a negative charge in at least one canonical description, wherein the charges are delocalized. The compound may also have a dipole moment.

The term "aprotic solvent" refers to a chemical compound that may have hydrogens on them somewhere, but lacking O—H or N—H bonds, and therefore cannot form hydrogen bond with themselves. In particular, the dipolar aprotic solvent may be N-methyl-2-pyrrolidone (NMP), N,N-dimethylformamide (DMF), tetrahydrofuran (THF), dimethylacetamide (DMA), N-butyl propionate, or dimethyl sulfoxide (DMSO). Preferably, the dipolar aprotic solvent is NMP.

During the ball milling process, the self-assemble monolayer-containing material is mixed with the polymer monomer and the dipolar aprotic solvent to form a slurry. The slurry may then be subjected to a heat treatment at a temperature of 20° C. to 300° C., in particular 50° C. to 300° C., preferably 80° C. to 300° C. so as to form a layered material.

With reference to FIG. 1, there is provided with a specific example illustrating a method of preparing an electrode material. In this example, carbon-coated SiO (SiO@C) was used as the active material (i.e. substrate). The carbon may be coated on SiO by a chemical vapor deposition process. (3-aminopropyl) triethoxysilane (>99% APTES) was used as the SAM layer. The powders were further coated with polyimide monomer (Dreambond 100). All chemicals were of analytical grade and used as received.

As shown, SiO@C powders were first treated by Ultraviolet-Ozone (UVO) plasma for 10 mins in air (PCE-22-LD). Afterwards, the powders were put inside a stainless-steel box with 5 mL APTES in a separate glass bottle under an argon atmosphere and sealed. The box was then heated to 150° C. overnight to obtain the amine-functionalized material (SiO@C@UV@NH2). The resulting powders were then mixed with 10% PI monomers in the presence of N-methyl-2-pyrrolidone (NMP) using a ball mill (200 rpm for half an hour). The resulting slurry was dried at 80° C. under vacuum for 12 hrs to remove the NMP, and then further heat-treated at 300° C. for 2 hrs in a nitrogen atmosphere to obtain the desired SiO@C@UV@NH2@PI composite where the surface of which being a PI coating.

In one example embodiment, the self-assembled monolayer is covalently attached to the substrate, forming a self-assembled monolayer-containing material functionalized with, for example, amine groups. The functional groups may further bind with a polymer monomer so as to form a polymer coating on the self-assembled monolayer-containing material. The functional groups may bind with the polymer monomer by a covalent bond, a hydrogen bond or a combination thereof. Preferably, the functional groups bind with a polyimide or a polyamide monomer by a covalent bond. A polyimide or a polyamide coating therefore is deposited on the self-assembled monolayer-containing material, forming a layered material.

With this multilayer arrangement, the SAM layer cross-links the substrate and the polymer coating, increasing the structural stability of the electrode material which may enhance the capability of the material in accommodating the volume change during lithiation and delithiation. In addition, the covalently-bonded surface coating increases chemical stability and prevents direct contact between the substrate and electrolyte.

In a specific example embodiment, the electrode material is a material as prepared by the method described above such as SiO@C@UV@NH2@PI. The material was characterized by various methods. The morphology and structure of the materials were studied by scanning electron microscopy. Thermogravimetric analysis (TGA) was performed from room temperature to 600° C. with a ramp rate of 5° C. $min^{-1}$ in air (TGA/DSC-1, Mettler-Toledo). XPS was performed on a Ulvac PHI Quantera II spectroscopy equipped with a monochromatic Al $K_\alpha$ source. The characterization results are described below with reference to FIGS. 2A to 3B.

Figure 3A:
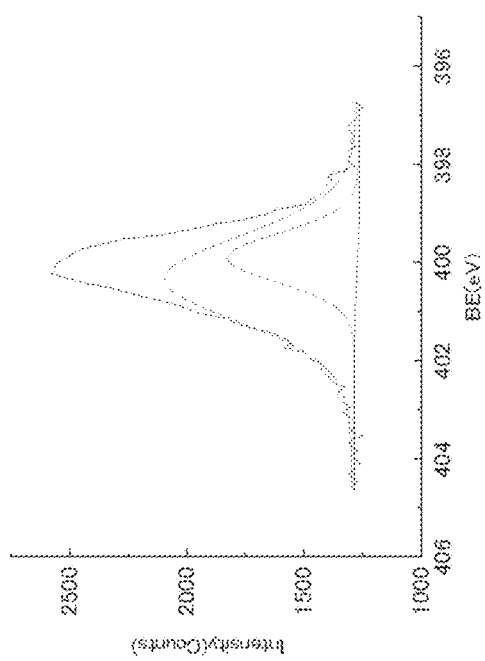
FIG. 3A is an X-ray photoemission spectroscopy spectrum showing the N1s XPS peaks for SiO@C@UV@NH$_2$.
Figure 3B:
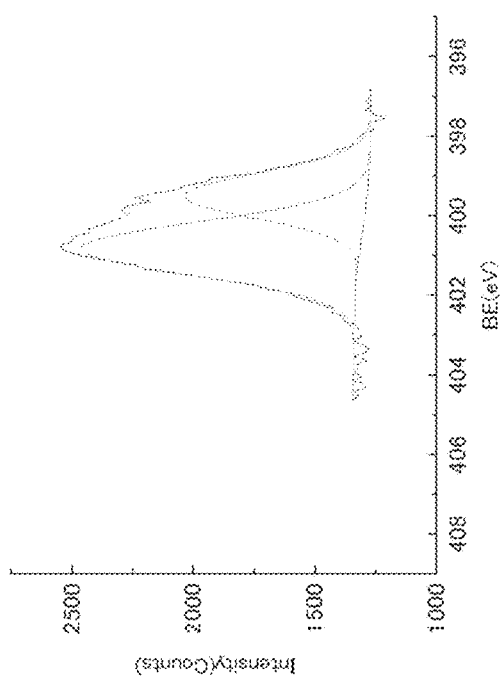
FIG. 3B is an X-ray photoemission spectroscopy spectrum showing the N1s XPS peaks for SiO@C@UV@NH$_2$@PI.

FIG. 2A refers to the scanning electron microscopy (SEM) image of a C-coated SiO particles. The particles are irregular in shape and have a particle size of 3-5 μm. The amount of C was determined to be 3 wt % by thermogravimetric analysis (TGA). After the C-coated SiO particles coated with SAM and PI, the particle shape and size remained the same (FIG. 2B). FIG. 2C refers to a higher magnification SEM image of FIG. 2B. As shown, the coated particles show a slightly roughened surface, which is attributed to the coating layer. The coating is uniform across the surface, as indicated by the even distribution of C and N on the surface of the SiO@C@UV@NH$_2$@PI particles with energy dispersive X-ray spectroscopy (EDX) (FIGS. 2D and 2E). TGA results as shown in FIG. 2F indicates a weight loss of 13% for the SiO@C@UV@NH$_2$@PI when heated in air, indicating the PI content is about 10 wt % after subtracting the C content. This value is consistent with the amount of PI precursors used. X-ray photoemission spectroscopy (XPS) is also used to track the coating process. While no N1s XPS peak can be detected from the SiO@C material, nitrogen peaks corresponding to the SAM and also PI are observed for the SiO@C@UV@NH2 and SiO@C@UV@NH2@PI materials (FIGS. 3A and 3B). X-ray diffraction of the sample before and after coating shows amorphous structure with no peaks, suggesting that the coating process does not alter the crystallinity of the material.

In one example embodiment, there is provided an electrode comprising an electrode material prepared by the method in the present invention. The electrode may be a composite consisting of a conductive material in contact with a metallic foil and a non-metallic part of a circuit, such as an electrolyte. Selectively, the electrode may be an anode arranged at which electrons leave an electrochemical cell and oxidation occurs or a cathode arranged at which electrons enter the cell and reduction occurs.

In a particular embodiment, the electrode is an anode including the electrode material as described above. The electrode may be prepared by mixing the electrode material with a carbon black such as acetylene black (AB) and a binder. The term "binder" refers to a chemically and electrochemically inert material that is responsible for holding the active material particles within the electrode of a battery together to maintain a strong connection between the electrode and the contacts. The phrase "chemically inert" means the material does not easily react with other substances to form a new substance or being consumed or decomposed. The phrase "electrochemically inert" means the material is resistant to reduction and/or oxidation. The binder may be selected from polyacrylic acid (PAA), caboxymethyl cellulose (CMC), polyacrylonitrile (PAN), polyvinylidene fluoride, styrene-butadiene copolymer (SBR), polyvinyl alcohol (PVA), etc. Preferably, the binder is PAA.

The slurry formed by the aforementioned mixture may be coated on a current collector such as a copper foil so as to form an electrode. It is appreciated that the electrode may be of any size and shape. In one example, the electrode is a disc. The electrode may be further assembled into a battery such as a coin cell containing an electrolyte, a counter electrode, and a separator.

In one embodiment, the electrode prepared as described above may have a stable cycle performance. The term "cycle performance" refers to a measure of the change of charge capacity and/or coulombic efficiency of the electrode over a charging and discharging cycle. Specifically, cycle performance is defined as the ratio of charge capacity on the $100^{th}$ cycle to that on the $3^{rd}$ cycle at a current of 150 mA $g^{-1}$. The phrase "stable" means the electrode has a capacity retention of at least 80%, particularly at least 85%, and preferably at least about 90%. In one example, the electrode of the present invention may have a stable cycling performance over at least 100 cycles. The inventors found that the electrode of the present invention has a stable cycling performance over 300 cycles even at a high current rate such as 1 A $g^{-1}$.

In another embodiment, the electrode prepared as described above may have a reduced thickness change during charging and discharging cycles. In particular, the reduced volume change is referenced to which the electrode consisting of the substrate such as a C coated SiO. Preferably, the thickness change of the electrode of the present invention is reduced by about half of the thickness change of the reference. One skilled in the art is aware of methods of determining the thickness change during charging and discharging cycles of an electrode, for example using a linear voltage displacement transducer (LVDT).

In yet another embodiment, the electrode containing the electrode material of the present invention may have an enhanced uniformity during charging and discharging cycles. The term "uniformity" refers to the qualitative amount of isolated particles being observed during the charging and discharging cycles. In other words, it is a degree of cracking being observed during the charging and discharging cycles. It is appreciated that the isolated particles may be observed by method known in the art, such as SEM. The inventors have found that the electrode of the present invention remained smooth after at least 100 cycles as compared with the electrode consisting of the substrate such as a C coated SiO.

In a specific example, the electrode material as described above, that is SiO@C@UV@NH2@PI is fabricated into an electrode. The material was mixed with acetylene black (AB) and polyacrylic acid (PAA) binder with a weight ratio of 6:1:2 with a mortar and a pestle to form slurry. The slurry is then coated onto Cu foil with a doctor blade. The electrode was dried on a hot plate and compressed by a roll press, after which the electrodes was punched into 16 mm diameter discs. The electrodes were then dried at 110° C. for 4 hours in a Buchi oven before they were transferred into an argon-filled glovebox. The electrodes were assembled into 2032 coin cells with 1 mol L$^{-1}$ LiPF$_6$ in fluoroethylene carbonate (FEC) and diethyl carbonate (DEC) electrolyte with a 1:1 ratio by volume (Dodo Chemical) as the electrolyte. Lithium metal was used as the counter electrode and Celgard 2325 membrane (Celgard Inc. USA) was used as the separator. Charge/discharge tests of the coin cells were carried out at current rates of 150 and 1000 mA g$^{-1}$ on a battery tester (Neware, China) between 0.01 and 3 V vs. Li/Li$^+$. All of the battery tests were carried out at 23±1° C. The capacities are calculated with respect to the total mass of the active material including the coating layer.

Figure 4A:
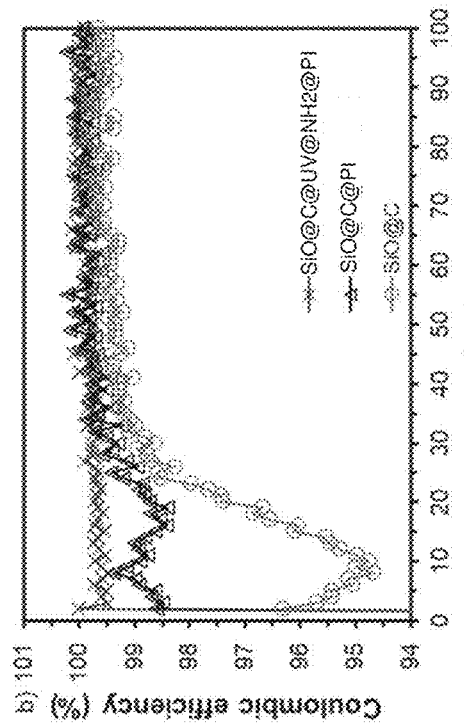
FIG. 4A is a plot of charge capacity against cycle of SiO@C, SiO@C@PI and SiO@C@UV@NH$_2$@PI at 150 mA g$^{-1}$.
Figure 4B:
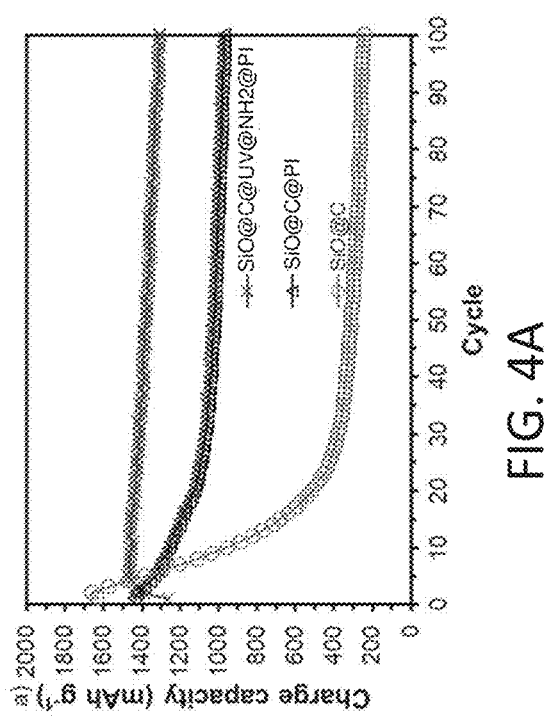
FIG. 4B is a plot of coulombic efficiency against cycle of SiO@C, SiO@C@PI and SiO@C@UV@NH$_2$@PI at 150 mA g$^{-1}$.
Figure 4C:
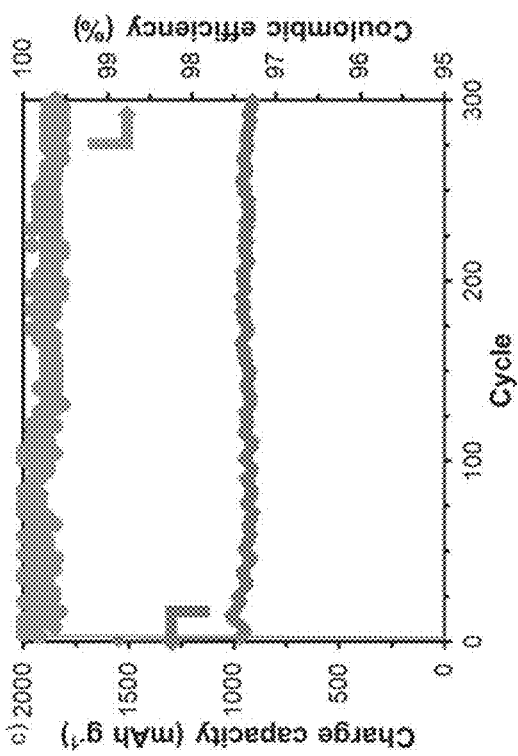
FIG. 4C is a combined plot of charge capacity and coulombic efficiency against cycle of SiO@C@UV@NH$_2$@PI at 1 A g$^{-1}$.
Figure 4D:
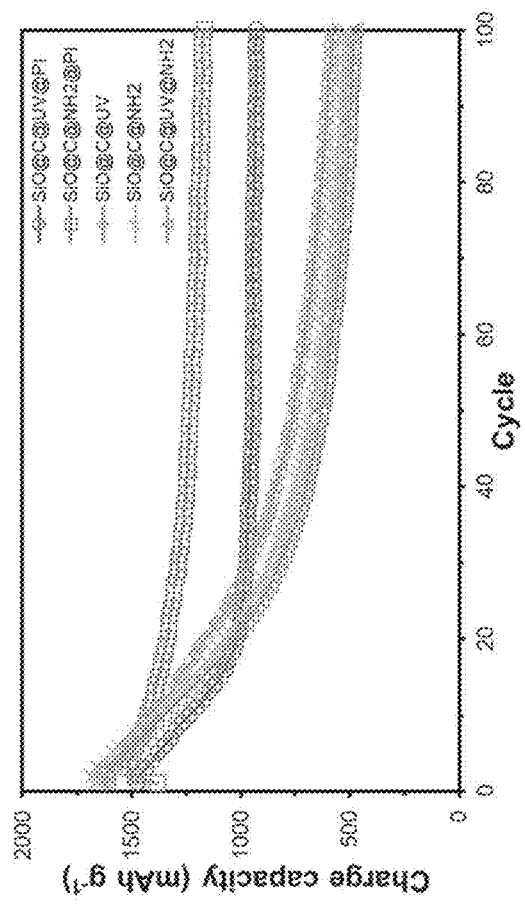
FIG. 4D is a plot of charge capacity against cycle of SiO@C@UV@PI, SiO@C@NH2@PI, SiO@C@UV, SiO@C@NH2 and SiO@C@UV@NH2 at 150 mA g$^{-1}$.
Figure 4E:
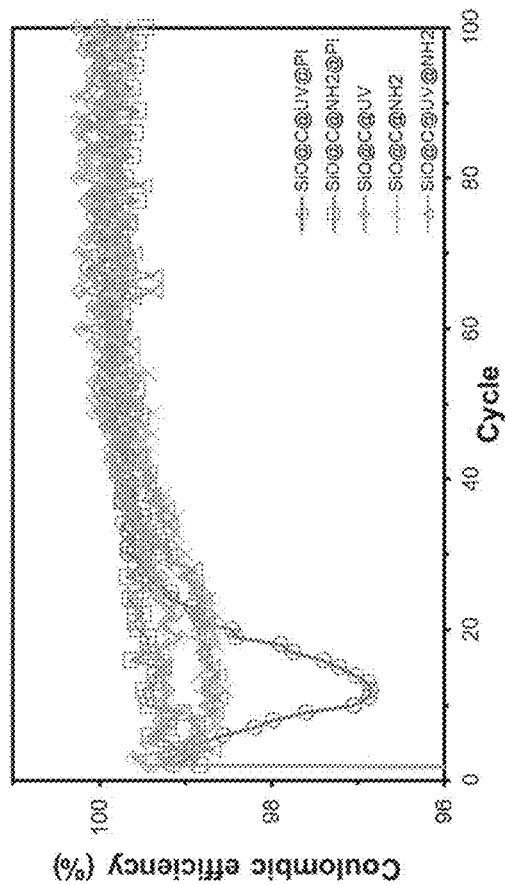
FIG. 4E is a plot of coulombic efficiency against cycle of SiO@C@UV@PI, SiO@C@NH2@PI, SiO@C@UV, SiO@C@NH2 and SiO@C@UV@NH2 at 150 mA g$^{-1}$.

To demonstrate the effect of the SAM layer and the PI layer, SiO@C, SiO@C@PI, SiO@C@UV@PI, SiO@C@NH2@PI, SiO@C@UV, SiO@C@NH2 and SiO@C@UV@NH2 were also tested for comparison. FIGS. 4A and 4D show the cycle performance of these electrodes respectively. SiO@C gives an initial charge capacity of 1634.9 mAh g$^{-1}$ at a current rate of 150 mA g$^{-1}$. Surface coating with or without SAM decreases the initial capacity of the material to about 1400 mAh g$^{-1}$, which is reasonable because the capacity is calculated based on the mass of the overall composite.

cycles, as the benefit of the coating on electrode stability is more apparent with larger number of cycles (FIG. 4C). A capacity of about 1000 mAh g$^{-1}$ is obtained initially, and 94.2% of the capacity remains reversible after 300 cycles. CE stays above 99.5% for the entire time, suggesting the superiority of the SAM/PI multilayer coating over other surface-treated SiO samples.

Figure 5A:
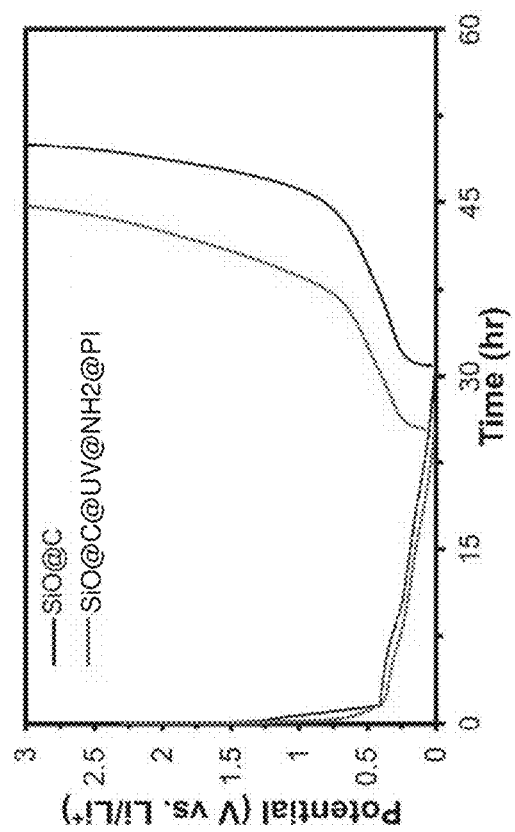
FIG. 5A is a plot of potential against time showing the voltage-time curves of 5 μm SiO@C and 5 μm SiO@C@UV@NH$_2$@PI.
Figure 5B:
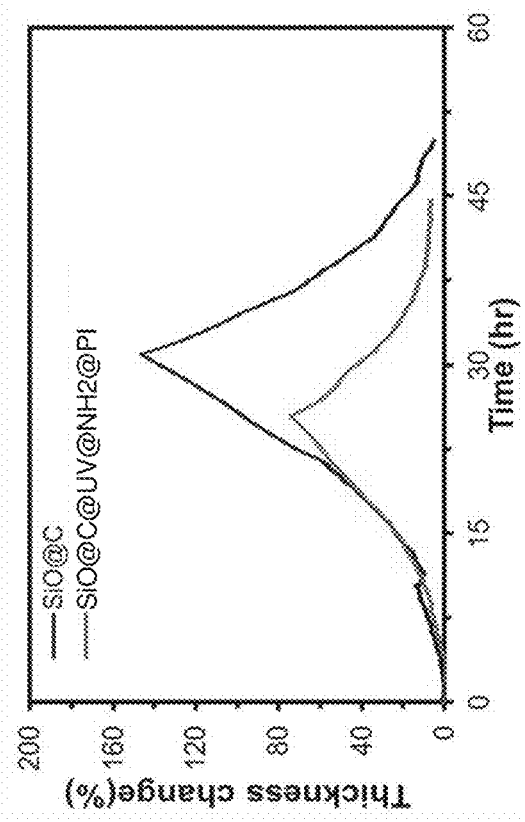
FIG. 5B is a plot of thickness change against time showing the thickness-time curves of 5 μm SiO@C and 5 μm SiO@C@UV@NH$_2$@PI.

In order to quantify the mechanical behavior of the electrodes, in-situ dilatometer test was conducted. Dilatometer can measure the thickness change of the electrode during charge and discharge using a linear voltage displacement transducer (LVDT). To show the degree of volume changes in the electrode, thickness changes of SiO and SiO@C@UV@NH2@PI electrodes were monitored during initial cycle with dilatometry (FIGS. 5A and 5B). The tests were carried out at a constant current rate of 150 mA g$^{-1}$, so the test time is proportional to the capacity of the electrode. Generally, the electrode thickness increases with lithiation and decreases with delithiation. The thickness changes of the SiO and SiO@C@UV@NH2@PI electrodes were about 150% and 78%, respectively. This shows that the volume expansion within the electrode can be suppressed by the SAM/PI multilayer.

TABLE 1

Comparison of charge-discharge performance of different surface-treated SiO samples.

| Comp Ex | | 1$^{st}$ discharge capacity (mAh g$^{-1}$) | 1$^{st}$ charge capacity (mAh g$^{-1}$) | First cycle efficiency (%) | 100$^{th}$ charge capacity (mAh g$^{-1}$) | Capacity retention (100$^{th}$/3$^{rd}$) (%) |
|---|---|---|---|---|---|---|
| 1 | SiO@C | 1954.7 | 1634.9 | 83.6 | 247.0 | 15.0 |
| 3 | SiO@C@NH2 | 1977.1 | 1667.0 | 84.3 | 521.4 | 31.5 |
| 4 | SiO@C@UV | 1896.4 | 1617.4 | 85.3 | 581.5 | 35.6 |
| 5 | SiO@C@UV@NH2 | 1910.8 | 1608.1 | 84.2 | 475.1 | 29.8 |
| 2 | SiO@C@PI | 1710.0 | 1440.0 | 84.2 | 974.0 | 67.6 |
| 6 | SiO@C@UV@PI | 1710.9 | 1479.0 | 86.4 | 930.1 | 64.7 |
| 7 | SiO@C@NH2@PI | 1703.7 | 1386.2 | 81.4 | 1165.8 | 77 |
| # | SiO@C@UV@NH2@PI | 1556.7 | 1267.3 | 81.4 | 1310.7 | 91.6 |

Without any SAM and PI coating, SiO@C shows a significant drop in capacity upon cycling. Reversible capacity is only 247.1 mAh g$^{-1}$ after 100 cycles, with a 15.1% capacity retention. A low coulombic efficiency (CE) between 95% to 99% is observed during the initial 30 cycles (FIG. 4B), suggesting that there are loss of lithium and other side reactions occurring for SiO@C, leading to the poor cycle performance. Coating SiO@C with PI alone improves its cycle performance (with a 67.6% capacity retention), suggesting that the PI layer has a positive effect towards stabilizing the material. However, a gradually fading from 1400 mAh g$^{-1}$ to 1000 mAh g$^{-1}$ is still observed for SiO@C@PI after 100 cycles, and the CE of SiO@C@PI remains between 98.5 and 99% within the first 30 cycles. Cycle performance is significantly improved by adding a SAM intermediate layer between the active material and PI (SiO@C@UV@NH$_2$@PI). After 100 cycles, a reversible capacity of about 1310.7 mAh g$^{-1}$ (capacity retention 93.8%, with respect of the 2$^{nd}$ cycle; capacity retention 91.6%, with respect of the 3$^{rd}$ cycle) is still maintained. In addition, an excellent average CE of 99.8% is observed throughout the cycles. The SAM acts as an intermediate layer to strengthen the bonding between SiO@C and the PI layer, thus improving the stability of the electrode.

The stability of the SiO@C@UV@NH2@PI electrode is further confirmed at a high current rate of 1 A g$^{-1}$ for 300

To further investigate the effect of the SAM/PI multilayer coating on the mechanical properties of the SiO electrodes, SEM images of the pristine SiO@C electrode and SiO@C@UV@NH$_2$@PI electrode were taken before and after certain cycles (FIGS. 6A to 6E). The pristine electrodes of both samples are smooth as the electrodes were roll-pressed before testing (FIGS. 6A and 6C). After 100 cycles, the SiO@C electrode is broken down into island-like protrusions, and isolated particles can be seen observed (FIG. 6B). These cracks originate from the large volume expansion and contraction of the particles during charge and discharge. On the other hand, SiO@C@UV@NH$_2$@PI electrode remains smooth after 100 cycles (FIG. 6D). Even when it is cycled for 300 times at a high current of 1 A g$^{-1}$, the integrity of the electrode is kept (FIG. 6E). All these evidences show that the PI coating supported by SAM keeps the particles connected and maintains uniformity of the electrode even after multiple charge and discharge cycles, leading to better cycle performance.

The present invention is advantageous in that, the electrode material retains the mechanical integrity of the particles and the electrode despite the volume change during lithiation and delithiation. In addition, it suppresses side reactions and improves Coulombic efficiency during cycling. The method of preparing the electrode is also simple and therefore the electrode can be commercialized for different applications. As such, the present invention may be further applied to other battery materials such as anode materials (e.g. Si, graphite, etc.) and cathode materials (e.g. $LiCoO_2$, $LiCoPO_4$, etc.).

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method of preparing an electrode material comprising the steps of:
    a) treating a substrate with ultraviolet-ozone to create reactive hydroxyl groups on the substrate;
    b) after step a), heating the substrate with a bonding agent to covalently attach the bonding agent to the substrate to form a self-assembled monolayer-containing material, wherein the hydroxyl groups on the substrate facilitate the attaching of the bonding agent to the substrate; and
    c) depositing a polymer coating onto the self-assembled monolayer-containing material under an elevated temperature to form a layered material.

2. The method in accordance with claim 1, wherein the bonding agent includes a compound of Formula (I):

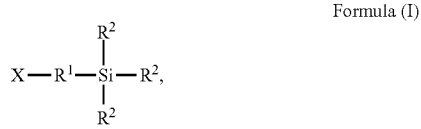

Formula (I)

wherein
    X is an epoxy group, ureido group, amino group, or an isocyano group,
    $R^1$ is an unsubstituted or substituted straight or branched alkyl chain having 1 to 17 carbon atoms,
    $R^2$ is an alkoxy group having 1 to 6 carbon atoms, a hydroxyl group, or a chloro group.

3. The method in accordance with claim 2, wherein the bonding agent includes the compound of Formula (I) with X being an ureido group or an amino group, $R^1$ being an unsubstituted straight alkyl chain having 1 to 17 carbon atoms, and $R^2$ being an alkoxy group having 1 to 6 carbon atoms.

4. The method in accordance with claim 2, wherein the bonding agent includes the compound of Formula (I) with X being an amino group, $R^1$ being a propyl group, and $R^2$ being an ethoxy group.

5. The method in accordance with claim 1, wherein step c) further includes a step of mixing the material obtained in step b) with a polymer monomer and a dipolar aprotic solvent to form a slurry.

6. The method in accordance with claim 5, wherein the polymer monomer includes a polyimide monomer, a polyamic acid monomer, a polyamide monomer, a polypyrrole monomer, or a polyaniline monomer.

7. The method in accordance with claim 5, wherein the dipolar aprotic solvent includes N-methyl-2-pyrrolidone, tetrahydrofuran, N,N-dimethylformamide, dimethylacetamide, or N-butyl propionate.

8. The method in accordance with claim 5, wherein the mixing process includes a ball milling process.

9. The method in accordance with claim 1, wherein the substrate includes a metal, a metal oxide, graphite, silicon-based material, metal phosphate, or lithium metal oxide.

10. An electrode material comprising a substrate pretreated by ultraviolet-ozone, a self-assembled monolayer formed on the substrate, and a polymer coating deposited on the self-assembled monolayer, wherein the self-assembled monolayer includes a bonding agent for covalently attaching to the surface of the substrate, wherein the ultraviolet-ozone pretreatment creates reactive hydroxyl groups on the substrate that facilitate the attaching of the bonding agent to the substrate.

11. The electrode material in accordance with claim 10, wherein the bonding agent includes a compound of Formula (I):

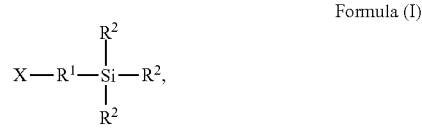

Formula (I)

wherein
    X is an epoxy group, ureido group, amino group, or an isocyano group,
    $R^1$ is an unsubstituted or substituted straight or branched alkyl chain having 1 to 17 carbon atoms,
    $R^2$ is an alkoxy group having 1 to 6 carbon atoms, a hydroxyl group, or a chloro group.

12. The electrode material in accordance with claim 11, wherein the bonding agent includes the compound of Formula (I) with X being an ureido group or an amino group, $R^1$ being an unsubstituted straight alkyl chain having 1 to 17 carbon atoms, and $R^2$ being an alkoxy group having 1 to 6 carbon atoms.

13. The electrode material in accordance with claim 11, wherein the bonding agent includes the compound of Formula (I) with X being an amino group, $R^1$ being a propyl group, and $R^2$ being an ethoxy group.

14. The electrode material in accordance with claim 10, wherein the polymer coating includes a polymer monomer for covalently attaching to the self-assembled monolayer or attaching to the self-assembled monolayer through hydrogen bonding.

15. The electrode material in accordance with claim 14, wherein the polymer monomer includes a polyimide monomer, a polyamic acid monomer, a polyamide monomer, a polypyrrole monomer, or a polyaniline monomer.

16. The electrode material in accordance with claim 10, wherein the substrate includes a metal, a metal oxide, graphite, silicon-based material, metal phosphate, or lithium metal oxide.

17. An electrode comprising an electrode material in accordance with claim 10.

18. The electrode in accordance with claim 17, wherein the electrode material is arranged to maintain uniformity of the electrode during charging and discharging cycles.

19. The electrode in accordance with claim 18, wherein the electrode material reduces cracking of the electrode during charging and discharging cycles.

* * * * *